United States Patent [19]

Chozianin et al.

[11] 3,978,246
[45] Aug. 31, 1976

[54] PROCESS OF MAKING A SWEETENED AND FLAVORED PEANUT BUTTER OR SPREAD AND PRODUCT THEREOF

[75] Inventors: Chris Chozianin, Morton Grove; Calvin R. Luce, Lake Zurich; Harold W. Zukerman, Skokie, all of Ill.

[73] Assignee: Kraftco Corporation, Glenview, Ill.

[22] Filed: Apr. 5, 1974

[21] Appl. No.: 458,233

[52] U.S. Cl. .................................................. 426/633
[51] Int. Cl.² .............................................. A23L 1/38
[58] Field of Search ............ 426/199, 209, 372, 99, 426/633

[56] References Cited
UNITED STATES PATENTS

| | | | |
|---|---|---|---|
| 1,395,934 | 11/1921 | Stockton | 426/209 X |
| 1,416,387 | 5/1922 | Sell | 426/209 |
| 1,696,766 | 12/1928 | Howe | 426/372 X |
| 1,890,180 | 12/1932 | Hoffman | 426/199 |
| 2,079,288 | 5/1937 | Hoffman | 426/372 X |
| 2,511,119 | 6/1950 | Mitchell, Jr. | 426/209 |
| 2,511,136 | 6/1950 | Vincent | 426/209 |
| 2,562,630 | 7/1951 | Mitchell, Jr. | 426/209 X |
| 2,911,303 | 11/1959 | Rowland et al. | 426/199 |
| 3,127,272 | 3/1964 | Baker et al. | 426/372 X |
| 3,129,102 | 4/1964 | Sanders | 426/199 |
| 3,216,830 | 11/1965 | Melnick | 426/209 X |
| 3,619,207 | 11/1971 | Dzurik et al. | 426/372 X |
| 3,671,267 | 6/1972 | Gooding | 426/209 |
| 3,749,587 | 7/1973 | Billerbeck et al. | 99/128 |

OTHER PUBLICATIONS

J. of Amer. Oil Chemists Soc., Aug. 1953, vol. XXX, No. 8, pp. 335–337.

Primary Examiner—Steven L. Weinstein
Attorney, Agent, or Firm—Fitch, Even, Tabin & Luedeka

[57] ABSTRACT

A flavored peanut composition is provided comprising a peanut spread or peanut butter in intimate mixture with a dispersion of sugar and flavor in a margarine type oil, the composition having a moisture level of less than about 1 percent. The sugar is present at a level in excess of about 10 percent of the composition and principally comprises sucrose. The flavored peanut composition is of smooth texture and does not stick to the roof of the mouth.

The flavored peanut composition is prepared by making a fluid peanut butter or peanut spread; making a dispersion of sugar and flavor in a margarine type oil with more fat than sugar being present in the dispersion; intimately mixing the peanut spread or peanut butter and dispersion in fluid or liquid condition at a temperature above about 110°F.; cooling the mixture with agitation to a temperature between about 45°F. and about 60°F.; and immediately packaging the flavored peanut composition.

8 Claims, No Drawings

PROCESS OF MAKING A SWEETENED AND FLAVORED PEANUT BUTTER OR SPREAD AND PRODUCT THEREOF

FIELD OF THE INVENTION

Peanut butter and peanut spreads have been long known and used as a food. Peanuts are rich in protein, carbohydrate material and oils, and provide a highly nutritious food. Over many years, efforts have been made to improve peanut butter and peanut spreads in respect of their flavor, stability, appearance, body and texture characteristics particularly in avoiding stickiness in the mouth. It has been known to provide flavor and sweetness in peanut spreads and peanut butter.

In order to provide desired sweetness, honey, dextrose and other sugars have been added to peanut spread and peanut butter, as well as to ground peanuts, and in order to provide flavor, a wide number of flavoring materials have been added, including vanilla, chocolate, and orange flavoring. In addition, it is known to add various nutrients, such as protein, corn meal, and vitamins.

A problem arises in achieving desired sweetness of peanut compositions because of the tendency of the sugars to crystallize when larger amounts of sucrose are used. It is also a problem to provide desired body and texture characteristics to a peanut composition when substantial amounts of sucrose are merely added to peanut spread and peanut butter. Furthermore, a problem of stability of the product occurs and the presence of water and high amounts of sugar in peanut compositions have resulted in discoloration.

DESCRIPTION OF THE PRIOR ART

Work has been done at the Georgia Agricultural Experiment Station and some of such work has been published in *Food Industries*, Volume 18, pages 525–526 and 634–640 (1946). The U.S. Department of Agriculture published a Marketing Research Report No. 29 in December, 1952 entitled Peanut Snack and Peanut Spread — Potential New Products.

U.S. Pat. No. 1,416,387 discloses the combination of syrups, granulated or brown sugar, and honey with peanut butter. U.S. Pat. Nos. 1,890,180 and 2,079,288 set forth the combination of honey with peanut butter and an edible oil. U.S. Pat. No. 3,044,883 teaches the combination of small amounts of honey with peanut butter, emulsifiers and edible oils, whereas U.S. Pat. No. 3,749,587 discloses a sweetened storage stable peanut butter spread comprising milled peanuts, honey and a substantially anhydrous monosaccharide. British Pat. No. 997,909 discloses a non-intimate combination of peanut butter and a sweetening composition which simulates aqueous foods such as jelly, jam, preserves and marshmallows and U.S. Pat. No. 3,278,314 discloses peanut butter in non-intimate combination with jelly, jam, preserves and marshmallows.

SUMMARY OF THE INVENTION

In accord with this invention, peanuts or a blend thereof are ground, after roasting, blanching and sorting to provide a peanut butter or peanut spread. A small amount of sugar and salt with suitable stabilizers in the form of hardened oils or glyceride emulsifiers may be added at the time of grinding to provide a desired peanut spread or peanut butter in accord with well known teachings in the art. The peanut butter or peanut spread comprises finely ground peanuts and is desirably stabilized so that it does not oil off.

The peanut butter or peanut spread at a temperature above about 110°F., so that it is in fluid condition, at a moisture of less than 1.5 percent, is intimately mixed with a dispersion of sugar and flavor in a margarine type oil, the dispersion having a moisture content of less than 1.0 percent. The mixed product is cooled from above about 110°F. with substantial agitation to a temperature between about 45°F. and about 60°F. whereupon it is immediately packaged with the flavored peanut composition having a moisture level of less than about 1 percent. It is important that the final moisture of the flavored peanut composition be below about 1 percent and preferably below 0.8 percent. The presence of higher amounts of water tend to result in crystallization of the sugar and instability of the flavored peanut composition.

The margarine type oil is a hardened oil of the type generally used in the manufacture of print margarines or its equivalent, and should have an SFI value (A.O.C.S. tentative method Cd 10–57) at 50°F. between about 25 and about 30 and at 92°F. of less than about 5. Desirably, the SFI value at 70°F. will be in the range of between about 14.5 and about 16.

To provide the desired sweetening effect for most flavors, the sugar should be at a level in excess of about 10 percent for the flavored peanut composition and for many flavors the level of sugar should exceed 15 percent. The level of sucrose in the sugar should exceed 50 percent of the weight of the sugar and the sucrose may be the whole sweetening agent. The sugar should be finely ground and have a fineness at least of the order of 6X confectioner's sugar to give desired properties to the flavored peanut composition.

The sugar in the dispersion should comprise less than the weight of fat so that the ratio of fat to sugar will be greater than one. Higher levels of sugar relative to the margarine type oil make the process substantially unworkable. However, to enjoy the benefits of this invention the ratio of fat to solids-not-fat in the dispersion should be in the range of 1.1 to about 1.4. Such ratio provides the flavored peanut composition with desired body and texture characteristics.

The resultant flavored peanut composition should have a fat level between about 50 percent and about 55 percent with a solids-not-fat level between about 45 percent and about 50 percent. This level of fat provides the desired characteristics for eating of the flavored peanut composition.

It is important to rapidly cool the mixture of peanut butter or peanut spread with the dispersion to a temperature between about 45°F. and 60°F. and preferably to a temperature in the range of 50°F. and 54°F. to achieve the desired texture characteristics. If the composition is cooled to a temperature above 60°F., it looses its characteristics and if it is cooled below about 50°F., it again looses desired characteristics although the use of lower temperatures may be, to some degree, compensated by appropriate tempering of the product. To achieve the quickness of cooling and agitation, the cooling is desirably achieved in a swept surface heat exchanger.

The flavoring material added to the margarine type oil may provide additional oil and solids, as for example, chocolate liquor and cocoa, or just provide solids and flavor as in the case of cinnamon. Of course, flavoring may be added without significant addition of oil or solids as when the product has vanilla or banana flavor.

The resulting flavored peanut composition has highly desirable spreading and eating characteristics with desired flavor and sweetness.

The penetration achieved in the peanut composition should be in the range of 100 to 300 at 72°F., and desirably is 150 plus or minus 50, which results from the formulation and cooling conditions in the heat exchanger. This is as measured with a Precision Scientific Penetrometer having a 41.3 gram, 65° cone and utilizing the procedure set forth in Tentative Method No. CC–16–60 of the American Oil Chemists' Society. The achievement of this penetration range is an important feature of the method and composition of the invention.

DESCRIPTION OF THE SPECIFIC EMBODIMENTS

For purposes of each of the specific examples set forth hereinafter and in view of the fact that the peanut spread or peanut butter portion of the peanut composition of the invention is a substantially conventional product, a typical peanut butter spread is prepared. More particularly, peanuts of the Runner and Spanish type are employed, and various varieties of each of the respective types may be used. The peanuts are roasted at a suitable temperature and discharged at a temperature of less than 100°F. The roasted peanuts are blanched in a conventional manner and the peanuts are then sorted and blended, also in a conventional manner. The peantus are fed between stones in a mill and while grinding of the peanuts is occurring, dextrose, powdered sugar, salt, stearine and a usual peanut butter stabilizer are metered into the mill. The mill is set to provide a fineness of grind in the range of between 15 to 18 half-mils. the mill comprises stones which effect grinding of the peanuts. The peanut butter exits from the mill at a temperature in the range of about 150°–165°F.

The peanut butter spread for the specific examples comprises about 90 percent peanuts, about 5.5 percent of a peanut butter stabilizer, 1.75 percent 6X confectioner's sugar, 1.75 percent dextrose, and 1 percent salt.

Also for each of the specific examples, the margarine type oil is a blend of hardened vegetable oils having a SFI value at 50°F. of between about 25 and 30, at 70°F. of between about 14.5 and 16, and at 92°F. of less than 5. Hereinafter, the margarine type oil is referred to as a BMO oil. The BMO oil, sugar and flavoring materials for each of the specific examples are blended together to provide a dispersion of sugar and flavor in the BMO oil.

EXAMPLE 1

For this example, a vanilla peanut composition was prepared and the dispersion comprised 57.78 percent BMO oil, 41.87 percent 6X confectioner's sugar and 0.34 percent of an imitation vanilla sugar. The dispersion was at a temperature of about 110°F. The peanut butter and dispersion were metered into a static mixer, the components being at a level of six parts peanut butter to four parts of the dispersion. After mixing of the peanut butter and the dispersion, the mixture, at a temperature of about 140°F., was fed into a swept surface heat exchanger and the product was cooled in about 60 seconds to 53°F., and discharged immediately into containers since the peanut composition sets in 20 to 30 seconds. The resulting product had a penetration of 150 plus or minus 50 at 72°F. and a moisture of less than 0.8 percent. The product had excellent spreadability and get-away in the mouth.

The resulting vanilla peanut composition had an analysis as follows:

| | |
|---|---|
| Fat | 54.5% |
| Salt | .7% |
| Dextrose | 1.0% |
| Sucrose | 17.7% |
| Moisture | .8% |

The SFI values of the total fat in the composition at the indicated temperatures is as follows:

| | |
|---|---|
| 50°F. | 13.8±2 |
| 70°F. | 7.2±1.5 |
| 92°F. | 2.0±1 |

EXAMPLE 2

In this example a banana flavored peanut composition was prepared by taking the peanut butter and mixing it with a dispersion comprising 55.1 percent BMO, 44.8 percent 6X confectioner's sugar and 0.01 percent of a banana flavor. The dispersion, as in the previous example, was mixed with the peanut butter in a static mixer but in a ratio of 64.5 parts peanut butter to 35.5 parts dispersion and fed into the heat exchanger at about 140°F., discharged at a temperature of about 53°F., and immediately packaged. The product had a penetration of 150 plus or minus 50 at 72°F. The resulting product had an analysis as follows:

| | | |
|---|---|---|
| Fat | 53.0 | % |
| Salt | .75 | % |
| Dextrose | 1.1 | % |
| Sucrose | 17.0 | % |
| Moisture | .8 | % |

The SFI values of the total fat at the indicated temperatures were as follows:

| | |
|---|---|
| 50°F. | 12.8±2 |
| 70°F. | 6.4±1.5 |
| 92°F. | 2.2±1 |

EXAMPLE 3

In accord with this example, a cinnamon flavored peanut composition was prepared as in the previous examples by mixing the peanut butter at a ratio of eight parts peanut butter to two parts dispersion. The dispersion comprised 58 percent BMO, 34.0 percent 6X confectioner's sugar and 8.0 percent cinnamon which was in the form of finely ground cinnamon. Thus, the solids not fat in the dispersion was 42 percent. The mixture of the dispersion and peanut butter entered the heat exchanger at about 150°F. and exited at about 53°F.

The analysis of the peanut composition was as follows:

| | | |
|---|---|---|
| Fat | 53.0 | % |
| Salt | .93 | % |
| Dextrose | 1.4 | % |
| Sucrose | 8.2 | % |
| Moisture | .8 | % |
| Penetration | 150 ± 50 | |

The SFI values of the total fat were as follows for the indicated temperatures:

| | |
|---|---|
| 50°F. | 8.2±2 |
| 70°F. | 3.3±1.5 |
| 92°F. | 0.8±1 |

EXAMPLE 4

A chocolate flavored peanut composition was prepared by blending six parts of the peanut butter with four parts of a dispersion. the dispersion comprised 43.5 percent BMO, 30.0 percent confectioner's 6X sugar, 10.0 percent chocolate liquor comprising about 50 percent fat, 16.25 percent of sweet milk chocolate comprising about 31 percent fat, and 0.25 percent of an imitation chocolate flavor. Thus, the fat comprised about 53.5 percent of the dispersion and the solids not fat comprised about 46.5 percent of the dispersion. The mixture entered the heat exchanger at about 140°F., and was discharged into containers at about 52°F. The penetration was 150 plus or minus 50.

The resulting product had an analysis as follows:

| | | |
|---|---|---|
| Fat | 53.0 | % |
| Salt | .7 | % |
| Dextrose | 1.05 | % |
| Sucrose | 13.05 | % |
| Moisture | .8 | % |

The SFI values for the indicated temperatures of the total fat were as follows:

| | |
|---|---|
| 50°F. | 14.4±2 |
| 70°F. | 6.2±1.5 |
| 92°F. | 2.3±1 |

It will be seen that in each of the examples the sugar content exceeds about 10 percent and that the sugar is predominantly sucrose in the form of fine confectioner's sugar. The dispersion in each of the examples comprised between about 53.5 percent BMO and about 58.0 percent so that the ratio of fat to solids not fat is in the range of between about 1.1 to 1.4. This is important in achieving the desired body, texture, and flavoring characteristics to the flavored peanut composition. It is also important to note that the moisture level is below 1 percent in the compositions made to achieve the desired stability and product. It will be understood, of course, that the peanut butter may have a moisture somewhat above 1 percent and the total end moisture of the composition adjusted down by using a dispersion having a moisture of less than 1 percent.

A particular feature of the composition of the specific examples is its stability at room temperature. In other words, refrigeration is not required.

A new product and process has been provided which makes possible a smooth, highly sweetened and flavored peanut composition which has not been possible to provide by earlier methods or disclosed in earlier formulations.

The various features of the invention which are believed to be new are set forth in the following claims.

We claim:

1. A method for manufacturing a flavored peanut composition comprising the steps of preparing a peanut butter or peanut spread having a moisture of less than 1.5 percent and having a temperature above about 110°F; dispersing sugar and flavor in melted margarine type oil having an SFI value at 50°F between about 25 and 30 and at 92°F of less than about 5, the ratio of fat to sugar in said dispersion being in excess of 1.0, the sugar being primarily sucrose, the moisture being less than 1 percent, and the temperature being in excess of about 110°F; intimately mixing said peanut butter or peanut spread and said dispersion of sugar and flavor in margarine type oil at a temperature above about 110°F to provide a fat level in the mixture between about 50 percent and about 55 percent and a solids-not-fat level between about 45 percent and about 50 percent; the level of sugar in said mixture being at least about 10 percent, rapidly cooling said mixture with agitation to between about 45°F and 60°F; and immediately packaging the flavored peanut composition at a moisture of less than about 1 percent.

2. The process of claim 1 wherein the ratio of fat to solids-not-fat in the dispersion is in the range of 1.1 to 1.4.

3. A flavored peanut composition prepared in accord with the process of claim 1.

4. The process of claim 1 wherein said sugar is at least about 50 percent sucrose.

5. The process of claim 1 wherein the cooling is effected in a swept surface heat exchanger to provide a flavored peanut butter composition having a penetration of between about 100 and 300 at 72°F.

6. The process of claim 5 wherein the penetration value is 150 ± 50.

7. The process of claim 6 wherein the flavored peanut composition is cooled to a temperature in the range of 50°F. to 54°F.

8. A flavored peanut composition prepared in accord with the process of claim 7.

* * * * *